Patented Aug. 11, 1942

2,292,734

UNITED STATES PATENT OFFICE 2,292,734

SYNTHETIC RESIN COMPOSITION AND PLASTICIZER

Franklin A. Bent, Berkeley, and Francis Gordon Byrne, Oakland, Calif., assignors to Shell Development Company, San Francisco, Calif., a corporation of Delaware No Drawing. Application December 11, 1939, Serial No. 308,626

11 Claims. (Cl. 260—36)

This invention relates to a method for the production of plasticized resins, to novel synthetic resin plasticizers, and to novel coating, film-forming and plastic compositions containing synthetic resins and the novel plasticizers.

Plasticizers are incorporated in synthetic resin compositions for the purpose of imparting plasticity and flexibility to the finished products. In general, compositions of synthetic resins used as plastics tend to crack and have poor molding and machining qualities when they are devoid of plasticizers. Coating and film-forming compositions containing no plasticizers likewise yield films which are inclined to crack and peel from the surface to which they are applied. These difficulties may be avoided, however, by having a suitable plasticizer present in the compositions. Since the plasticizer must remain in the synthetic resin from which the articles or films are made in order to maintain the finished product in a flexible condition, one of the requirements of a substance used as a plasticizer is that it be substantially non-volatile at ordinary temperatures so as not to evaporate to an appreciable extent from the resin. The plasticizer must also form a homogeneous mixture or be compatible with the resin. Other requirements to be met by a substance used as a plasticizer are that it be substantially colorless and odorless and also be tasteless when employed to plasticize resin compositions for coating food containers and the like. To be commercially attractive, a plasticizer must also be of simple chemical constitution which may be cheaply produced.

It is an object of the present invention to provide a method of plasticizing synthetic resins with substances which may be easily and cheaply manufactured from readily available raw materials. Another object of the invention is to provide a method of plasticizing a variety of types of synthetic resins. A still further object of the invention is to provide new plasticized synthetic resin compositions, and synthetic resin plasticizers.

It was found that these and other objects of the invention may be accomplished by plasticizing synthetic resins with partially hydrogenated products obtained by condensing a lower ketone with a ketone or an aldehyde, which products contain at least 12 and preferably at least 18 carbon atoms per molecule. According to the invention, the plasticizer with which the resins are plasticized and rendered flexible is a mixture of substantially saturated higher ketones and alcohols, which preferably contain the ketones in predominating amounts.

The plasticizer may be prepared by condensing a lower ketone with itself, a dissimilar ketone or an aldehyde under conditions which favor the formation of unsaturated ketones of high molecular weight, and the unsaturated ketones resulting from the condensation reactions may then be partially hydrogenated to yield a mixture of ketones and alcohols which are substantially saturated.

The hydrogenation of the unsaturated ketones may occur in several steps. The hydrogen may first add to the double bonds in the molecules to produce a saturated ketone and the carbonyl group may next be reduced to a carbinol group. In practice, however, hydrogenation of the unsaturated ketones does not occur in a clean cut manner since some of the ketone may be reduced to the corresponding alcohol before all of the unsaturated ketone has been saturated. Complete hydrogenation would of course, yield a product consisting of saturated alcohols and containing no ketones. Reference is therefore made by the expression "partially hydrogenated" to that state of hydrogenation where the product is substantially saturated and may contain more or less of alcohols, but is not completely reduced to alcohols and devoid of ketones.

Condensation of a lower ketone with itself, a dissimilar ketone, or an aldehyde to form the high molecular weight unsaturated ketones may be done by conducting the reaction so as to favor crotonaldehyde type of condensation to the exclusion of aldol type of condensation. While this may be realized by employing strong mineral catalysts such as hydrochloric acid, sulphuric acid and the like, it is usually preferable to use as catalyst strong mineral bases such as sodium hydroxide, potassium hydroxide and the like. By using strong mineral bases and removing the water formed in the reaction substantially as fast as formed, a number of molecules of reactants may be combined to yield the desired unsaturated ketone.

The ketones used as starting materials may be either saturated or unsaturated compounds. Suitable ketones include acetone, methyl ethyl ketone, methyl propyl ketone, diethyl ketone, methyl butyl ketone, methyl isobutyl ketone, methyl vinyl ketone, methyl isopropenyl ketone, mesityl oxide, cyclopentanone, cyclohexanone, etc. These may be condensed with themselves by employing only a single reactant in the reaction mixture or they may be condensed with other ketones by using two or more ketones in the reaction mixture. In addition to the ketone or ketones, the reaction mixture may contain one or more aldehydes. Suitable aldehydes which may be employed include acetaldehyde, propionaldehyde, butyraldehyde, isobutyraldehyde, ethyl hexaldehyde, acrolein, crotonaldehyde, methacrolein, ethyl propyl acrolein, and the like. Of the various ketones and aldehydes which may be reacted, mesityl oxide as a single reactant for the condensation reaction is a preferred substance. This material is readily available and gives good yields of the desired unsaturated ketones. Upon completion of the condensation reaction, the products may be separated from the catalyst in any suitable manner, such as, for example, by washing with water and a neutralizing agent. The product may then be separated from the unreacted material and into fractions of suitable molecular weight by distillation or, if desired, the product may be hydrogenated without separation or with only partial separation. The condensation products are branched chain unsaturated ketones which may contain cyclic arrangements of carbon atoms.

The unsaturated ketones are catalytically hydrogenated, preferably in the liquid phase, to prepare the plasticizer. This may be done by subjecting the unsaturated ketone to the action of hydrogen at elevated temperature and pressure in the presence of a hydrogenation catalyst. Representative substances which may be employed as catalysts are, among others, nickel, cobalt, iron, copper, platinum and silver. If desired, the catalyst may contain one or more promoters such as oxides of cerium, thorium or chromium. It may also be desirable to mount the catalyst on a carrier such as active carbon, activated alumina, kieselguhr, silica gel or the like. Nickel is a preferred catalyst, however, and a nickel catalyst prepared as described by Raney in United States Patent No. 1,628,190 is particularly suitable.

In order to only partially hydrogenate the unsaturated ketones, the hydrogenation is conducted under mild conditions. Temperatures from ordinary room temperature to about 125° C. may be used. The pressure also has an effect upon the degree of hydrogenation and the desired partially hydrogenated products may be obtained at pressures of from about 100 to 1000 lbs. per sq. in. If desired, the partially hydrogenated products may be produced by first hydrogenating at higher temperatures such as up to 250° C. and at higher pressures up to 3000 lbs. per sq. in. to first substantially convert all the unsaturated ketones to substantially saturated alcohols and then reduce the pressure while maintaining the elevated temperature whereby the alcohols dehydrogenate to the saturated ketones.

The hydrogenation catalysts are in general quite sensitive to the presence of impurities such as sulfur and halogens and it is therefore desirable to avoid contamination of the unsaturated ketones with impurities of this nature. If appreciable amounts of catalyst poisons are present in the materials hydrogenated, the activity of the catalyst will be greatly reduced or destroyed.

According to the invention, synthetic resins with which the mixtures of substantially saturated ketones and alcohols are compatible, are plasticized by intimately mixing the ketone-alcohol mixture containing at least 12 carbon atoms per molecule with the synthetic resins. The mixture of ketones and alcohols is compatible with and may be employed to plasticize a variety of synthetic resins. Among these may be mentioned nitrocellulose; vinyl ester resins including both organic and inorganic esters such as polyvinyl chloride, polyvinyl bromide, polyvinyl acetate, interpolymers of vinyl chloride and vinyl acetate, etc.; halogenated rubber, such as chlorinated rubber, brominated rubber, etc.; polyvinyl acetals including those made from various aldehydes like formaldehyde, acetaldehyde, butyraldehyde, etc.; acrylate resins such as polymerized esters of acrylic acid; methacrylate resins such as polymerized esters of methacrylic acid; cellulose ethers such as ethyl cellulose, methyl cellulose, benzoyl cellulose; rubber condensation derivatives such as the resins obtained by treating rubber with chlorostannic acid; and the like. Thus a variety of types of resins may be plasticized according to the method of the invention, it only being necessary that the plasticizer be compatible with the resin, i. e. that the resin and plasticizer form a homogenous mixture.

The plasticizer may be incorporated with the resin by any of the well-known methods. When no solvent is used, the plasticizer may be worked into the resin on a heated roll-mill or the resin may be heated to render it fluid and the plasticizer mixed in by manual kneading or by mechanical agitation. If desired, the mixing may be done in the presence of a solvent. Thus in the preparation of coating compositions the synthetic resin, the plasticizer and any other ingredients may be dissolved or dispersed in solvents and the components of the coating composition intimately mixed. With resins that are obtained by polymerization, the plasticizer may be mixed with the monomeric substances and these may then be polymerized to yield the synthetic resin containing the plasticizer.

The proportion of plasticizer employed with the resin is largely determined by the properties desired for the finished product. In general, the larger the proportion of plasticizers, the more flexible will be the plasticized resin. In some cases, a few percent based on the synthetic resin will be sufficient, while in others as much as one part or even more of plasticizer per part of resin may be desirable. The proportion of plasticizer is also dependent upon the particular resin used. For example, certain of the resins from acrylate esters are not inherently brittle and may be plasticized with relatively small proportions of the mixture of ketones and alcohols. On the other hand, resins prepared by the action of chlorostannic acid on rubber which are known to the trade as pliolite are extremely brittle and subject to cracking in an unplasticized condition. These may require quite large proportions of plasticizer to give satisfactory compositions.

The proportion of ketones to alcohols in the plasticizer may also be varied to meet the requirements of the resin which is employed. In some cases, it is desirable to have substantially only ketones in the plasticizer while in others it may be advantageous to use various proportions of alcohols in admixture with the ketones. In general, it is preferable to employ a mixture of ketones and alcohols wherein the ketones predominate, i. e., mixtures which contain more than 50 per cent ketones. Thus mixtures of ketones and alcohols which are partially hydrogenated condensation products and contain from 60 to as much as 90 or more per cent ketones are very desirable. For example, partially hydrogenated mesityl oxide condensation products of 12, 18, 24 or more carbon atom isomers which contain 60 or more per cent ketones are well suited as plasticizers for synthetic resins compatible therewith. However, in some cases there may also be used mixtures containing lesser amounts of ketones such as the more highly hydrogenated condensation products with 70 to 95 per cent alcohol contents. For cases where mixtures of this type may be desirable, the partially hydrogenated mesityl oxide condensation products are also suitable. The most desirable proportion of alcohols to ketones in the plasticizer employed with a particular resin may be readily ascertained by those skilled in the art.

The number of carbon atoms per molecule in the plasticizer is at least 12 and is preferably at least 18. Particularly suitable materials are those containing from 18 to 24 carbon atoms although those containing more than 24 carbon atoms are also satisfactory. The mixtures containing the lower ketones and alcohols, i. e. from 12 to 18 carbon atoms per molecule may also be used as high-boiling solvents in coating compositions wherein it is desirable to incorporate a solvent of low-volatility. For this purpose, materials of this type are well suited because of their high solubility for the resins and their resistance towards water which causes blushing of the resulting films.

The composition containing the synthetic resins and plasticizer may contain other ingredients if desired. Thus there may be incorporated in the compositions suitable dyes or various fillers and pigments such as carbon black, barytes, titanium oxide, zinc oxide, wood flour, and other pigments and fillers employed in the plastic and coating industries. The compositions may also contain other suitable plasticizers besides that of the invention, if desired, including tricresyl phosphate, dibutyl phthalate, camphor, sulphonamides, chlorinated aromatics, castor and linseed oils, phthalides, borate esters, analides, and the like.

By employing the plasticizer in coating compositions, the film obtained after evaporation of the liquid vehicle will be tough, flexible and not subject to cracking or peeling. The coating compositions may contain in addition to the synthetic resin and plasticizer of the invention solvents such as esters, ketones, alcohols, aromatic and aliphatic hydrocarbons, etc., pigments, other plasticizers, natural gums and resins such as copal, dammar, pontianak, etc., and other constituents well known to the art.

The products of the invention have many useful applications. The plasticized synthetic resins may be used as surface coverings, artificial silk filaments, photographic and cinematographic films, sheets, rods, tubes, and articles of any desired shape. Another important application is in the manufacture of laminated glass; resins plasticized with the mixture of ketones and alcohols are particularly suited for this purpose. Polyvinyl acetals are suitable resins for this application which yield clear, water-white films. By polyvinyl acetals are meant resins resulting from reaction of polyvinyl alcohol with aldehydes such as formaldehyde, acetaldehyde, butyraldehyde and the like. Polyvinyl acetal resins plasticized with the mixtures of higher alcohols and ketones are well suited for use in laminated glass because composition is substantially light stable, has excellent water resistivity, and remains tough and flexible even at very low temperatures.

In order to further illustrate the invention, but without being limited to details given therein, the following examples are given.

Example I

An 18 carbon atom unsaturated ketone composition was prepared by condensing mesityl oxide in the presence of strong aqueous sodium hydroxide, and subsequently partially hydrogenating the condensation product to a mixture of substantially saturated ketones and alcohols. The compatibility of the mixture of the ketones and alcohols for synthetic resins was determined by dissolving in suitable solvent one part of the plasticizer and two parts of the following resins: Pliolite (a rubber derivative), Tornesite (a chlorinated rubber), Vinylite HB (an interpolymer of vinyl chloride and vinyl acetate), ethyl cellulose, and nitrocellulose. The films obtained in each case upon evaporation of the solvent were clear indicating excellent compatibility. Films were prepared on thin metal panels and the panels were bent through an angle of 180° over a ⅛ inch mandrel. In no case was the film ruptured indicating that the ketone-alcohol mixtures had imparted plasticity to the resins. The films also had excellent odor.

Example II

By alkaline condensation of mesityl oxide, some 24 carbon atom unsaturated ketones were prepared. The condensation product was then partially hydrogenated to a mixture of ketones and alcohols. About two parts of a polyvinyl acetal resin known to the trade as Formvar, and one part of the plasticizer, were dissolved in ethylene dichloride. Successive applications of the solution was made to a metal plate until a film approximately 0.36 mm. thick was obtained. The film was then stripped from the plate and the elongation, which is a measure of the flexibility of the film, was measured on a Scott tensile strength testing machine. The film was found to have an elongation of about 458% with a 3 kilogram weight at a temperature of 24 to 27° C. A similar film was prepared without any plasticizer and found to have an elongation of only 304%.

We claim as our invention:

1. A plasticized composition containing a polyvinyl acetal and a plasticizer which is a partially hydrogenated mesityl oxide condensation product comprising a mixture of substantially saturated ketones and alcohols, each ketone and alcohol of which contains at least 12 carbon atoms per molecule.

2. A plasticized composition containing a vinyl ester resin and a plasticizer which is a partially hydrogenated mesityl oxide condensation product comprising a mixture of substantially saturated ketones and alcohols, each ketone and alcohol of which contains at least 12 carbon atoms per molecule.

3. A plasticized composition containing a plasticizer which is a partially hydrogenated mesityl oxide condensation product comprising a mixture of substantially saturated ketones and alcohols, each ketone and alcohol of which contains at least 12 carbon atoms per molecule, and a thermoplastic synthetic plastic compatible with said plasticizer.

4. A plasticized composition containing a plasticizer which is a partially hydrogenated condensation product, comprising a mixture of substantially saturated ketones and alcohols, each ketone and alcohol of which contains at least 12 carbon atoms per molecule of a ketone with a carbonyl compound of the group consisting of the ketones and aldehydes, and a thermoplastic synthetic resin compatible with said plasticizer.

5. A plasticized composition containing a plasticizer which is a mixture of substantially saturated ketones and alcohols containing at least 12 carbon atoms per molecule obtained by partially hydrogenating a condensation product of a ketone with a carbonyl compound of the group consisting of the ketones and aldehydes, and a thermoplastic synthetic plastic miscible with the ketone-alcohol mixture.

6. The method of plasticizing a polyvinyl acetal resin which comprises incorporating therewith a partially hydrogenated mesityl oxide condensation product comprising a mixture of substantially saturated ketones and alcohols, each ketone and alcohol of which contains at least 12 carbon atoms per molecule.

7. The method of plasticizing a vinyl ester resin which comprises incorporating therewith a partially hydrogenated mesityl oxide condensation product comprising a mixture of substantially saturated ketones and alcohols, each ketone and alcohol of which contains at least 12 carbon atoms per molecule.

8. The method of plasticizing nitrocellulose which comprises incorporating therewith a partially hydrogenated mesityl oxide condensation product comprising a mixture of substantially saturated ketones and alcohols, each ketone and alcohol of which contains at least 12 carbon atoms per molecule.

9. A method of plasticizing a thermoplastic synthetic resin which comprises incorporating a partially hydrogenated mesityl oxide condensation product comprising a mixture of substantially saturated ketones and alcohols, each ketone and alcohol of which contains at least 12 carbon atoms per molecule with a thermoplastic synthetic resin compatible therewith.

10. A method of plasticizing a thermoplastic synthetic resin which comprises incorporating a partially hydrogenated condensation product, comprising a mixture of substantially saturated ketones and alcohols, each ketone and alcohol of which contains at least 12 carbon atoms per molecule, of a ketone with a carbonyl compound of the group consisting of the ketones and aldehydes with a thermoplastic synthetic resin compatible therewith.

11. A method of plasticizing a thermoplastic, synthetic plastic which comprises incorporating a mixture of substantially saturated ketones and alcohols, each ketone and alcohol of which contains at least 12 carbon atoms per molecule obtained by partially hydrogenating a condensation product of a ketone with a carbonyl compound of the group consisting of the ketones and aldehydes with a thermoplastic synthetic plastic compatible therewith.

FRANKLIN A. BENT.
FRANCIS GORDON BYRNE.